US010761955B2

(12) United States Patent
Grieco et al.

(10) Patent No.: US 10,761,955 B2
(45) Date of Patent: *Sep. 1, 2020

(54) ROGUE HARDWARE DETECTION THROUGH POWER MONITORING

(71) Applicant: Cisco Technology, Inc., San Jose, CA (US)

(72) Inventors: Anthony H. Grieco, Wake Forest, NC (US); Chirag Shroff, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/891,868

(22) Filed: Feb. 8, 2018

(65) Prior Publication Data

US 2018/0157572 A1 Jun. 7, 2018

Related U.S. Application Data

(63) Continuation of application No. 14/060,048, filed on Oct. 22, 2013, now Pat. No. 9,934,119.

(51) Int. Cl.
*G06F 21/57* (2013.01)
*G06F 11/30* (2006.01)
*G06F 21/81* (2013.01)

(52) U.S. Cl.
CPC ...... *G06F 11/3062* (2013.01); *G06F 11/3031* (2013.01); *G06F 21/575* (2013.01); *G06F 21/81* (2013.01); *G06F 11/3093* (2013.01)

(58) Field of Classification Search
None
See application file for complete search history.

(56) References Cited

U.S. PATENT DOCUMENTS 6,541,878 B1 4/2003 Diab
7,061,142 B1 6/2006 Marshall
(Continued)

FOREIGN PATENT DOCUMENTS

WO 2006133149 A2 12/2006
WO 2012061663 A2 5/2012
(Continued)

OTHER PUBLICATIONS

Larry Wakeman, AN-757 Measuring Ethernet Tap Capacitance, Mar. 1991, National Semiconductor Application Note 757, Texas Instruments, 6 pages.
(Continued)

*Primary Examiner* — Thomas C Lee
*Assistant Examiner* — Gary Collins
(74) *Attorney, Agent, or Firm* — Edell, Shapiro & Finnan, LLC (57) ABSTRACT

Techniques are provided for monitoring power consumption for individual systems or devices as a way to detect illicit or rogue hardware, e.g., addition of an unauthorized integrated circuit (IC), which may have been added to an existing system. Techniques include monitoring a power on sequence of a system, the power on sequence including one or more distinct stages, determining for each stage of the one or more distinct stages of the power on sequence, whether an observed power load of any distinct stage has deviated from an expected power load according to a power profile for the system, and when the observed power load of a given distinct stage has deviated from the expected power load, performing an action indicating that a deviation from the expected power load has occurred. The power profile specifies expected power characteristics of the system for each stage of a power on sequence.

20 Claims, 10 Drawing Sheets

(56) References Cited

U.S. PATENT DOCUMENTS

| | | | |
|---|---|---|---|
| 7,624,217 B2* | 11/2009 | Geiger | G06F 13/4072 710/301 |
| 7,657,938 B2 | 2/2010 | Palmer, Jr. et al. | |
| 8,018,349 B1 | 9/2011 | Getker et al. | |
| 8,230,270 B2 | 7/2012 | Pont et al. | |
| 8,300,666 B2 | 10/2012 | Karam et al. | |
| 8,305,906 B2 | 11/2012 | Karam | |
| 8,543,247 B2 | 9/2013 | Boss et al. | |
| 2005/0257262 A1 | 11/2005 | Matityahu et al. | |
| 2009/0254769 A1 | 10/2009 | Brundridge et al. | |
| 2010/0138174 A1 | 6/2010 | Archibald et al. | |
| 2011/0313582 A1 | 12/2011 | Van Megen et al. | |
| 2013/0318607 A1 | 11/2013 | Reed et al. | |
| 2014/0344930 A1 | 11/2014 | Foley | |
| 2015/0113309 A1 | 4/2015 | Grieco et al. | |
| 2015/0317475 A1* | 11/2015 | Aguayo Gonzalez | G06F 21/55 726/23 |

FOREIGN PATENT DOCUMENTS

| | | |
|---|---|---|
| WO | 2012123400 A1 | 9/2012 |
| WO | 2012128817 A2 | 9/2012 |
| WO | 2012128912 A2 | 9/2012 |

OTHER PUBLICATIONS

International Search Report and Written Opinion for corresponding PCT Application No. PCT/US2014/059014, dated Feb. 19, 2015, 8 pgs.

* cited by examiner

FIG.1

| STAGE | DESCRIPTION |
|---|---|
| PP1 | PHASE 1 BOOT UP POWER PROFILE |
| PP2 | PHASE 2 BOOT UP POWER PROFILE |
| PP3 | PHASE 3 BOOT UP POWER PROFILE |
| ⋮ | ⋮ |
| PPn | PHASE n STEADY STATE POWER PROFILE |

ROGUE HARDWARE DETECTION THROUGH POWER MONITORING

CROSS REFERENCE TO RELATED APPLICATIONS

This application is a continuation of U.S. application Ser. No. 14/060,048, filed Oct. 22, 2013, entitled "Rogue Hardware Detection Through Power Monitoring," the entire contents of which are hereby incorporated by reference.

TECHNICAL FIELD

The present disclosure relates to customization of power managers, and in particular, to applications for monitoring power consumption in hardware.

BACKGROUND

Power managers have become an integral component of complex electronic systems. Such power managers may perform multiple functions including converting external power sources to appropriate voltages and currents for system operation as well as providing power sequencing upon boot-up. In order to provide such functionality, power managers may contain a microprocessor and memory in addition to other relevant hardware.

DESCRIPTION OF EXAMPLE EMBODIMENTS

Overview

Techniques are provided for customization of power managers, and in particular, monitoring power consumption from boot-up through steady-state operation, as well as during addition or removal of external devices, e.g., pluggable modules, line cards, etc. Such customization can be used to monitor the power consumption of individual devices or systems as a way to detect illicit or "rogue" hardware, e.g., an addition of an unauthorized integrated circuit (IC) or wireless transmitter, which may have been covertly added to an existing system. Techniques include monitoring a power on sequence of a system, the power on sequence comprising one or more distinct stages (or phases), determining, for each stage of the one or more distinct stages of the power on sequence, whether an observed power load (or power consumption) of any distinct stage has deviated from an expected power load according to a composite power profile for the system, and when the observed power load of a given distinct stage has deviated from the expected power load for that stage, performing an action indicating that a deviation from the expected power load has occurred.

Example Embodiments

Power managers are an integral component of numerous complex electronic systems, e.g., motherboards, controllers, cell phones, computers, switches and routers, etc. Such complex electronic systems may contain any number of the following types of functional blocks including, e.g., Field Programmable Gate Arrays (FPGAs), Application Specific Integrated Circuits (ASICs), microprocessors, Application Specific Standard Products (ASSPs), analog circuitry, and complex programmable logic devices (CPLDs), etc., which may each require a different power supply or voltage to achieve optimal functionality.

A power manager may be a discrete logic component (or multiple discrete logic components) that controls the voltage and power sequencing of system components as the system is brought online or offline. In some embodiments, a power manager may be an individual discrete component placed on a region of a circuit board. For example, a power manager may be attached to a motherboard, installed in an open slot of a computer chassis, or have components included as part of CPU packaging.

Power managers help maintain constant supply voltages for various components of a system, by taking an input voltage, e.g., from a power source, and converting this voltage into a power supply suitable for a particular component. Conversions may include analog to digital conversions (e.g., converting an analog power supply to a DC power supply suitable for digital components), as well as stepping up or stepping down DC voltages. In addition to providing power to digital or analog circuitry, power managers may also supply power to mixed signal circuitry that combines both digital and analog circuitry.

Additionally, power managers orchestrate, through power sequencing, the manner in which a system is powered up or powered down. Power sequencing involves bringing various components online in a predetermined and consistent order, e.g., a predetermined boot order or other predetermined order. For example, certain voltages may be applied prior to other voltages, so as not to adversely impact or damage electrical circuitry by applying an incompatible signal, e.g., a voltage (or current) outside a specified range, to a particular component.

In accordance with embodiments described herein, power manager operations are further configured to provide security functionality. More specifically, attacks aimed at compromising data security may occur in the form of a hardware attack, in which unauthorized or rogue hardware is covertly added to a system. In an effort to detect such rogue hardware, a power manager having microprocessing capabilities can be configured to detect, e.g., changes in power, voltage or some other related parameter, thereby detecting the addition of unauthorized hardware. For example, a given component (or part) containing a microprocessor, such as an integrated circuit or die (e.g., CPU) or a wireless transmitter, may be added to or used to replace part of an existing system. If, e.g., the newly added or replacement part consumes more power as compared to the original part (or system), the power manager can detect such a deviation and take appropriate action. In accordance with embodiments described herein, a power manager may be used to monitor power, voltage, current, impedance, timing and other related characteristics of a system in order to detect rogue hardware. This is described more fully below in conjunction with FIGS. 1-9.

Figure 1:
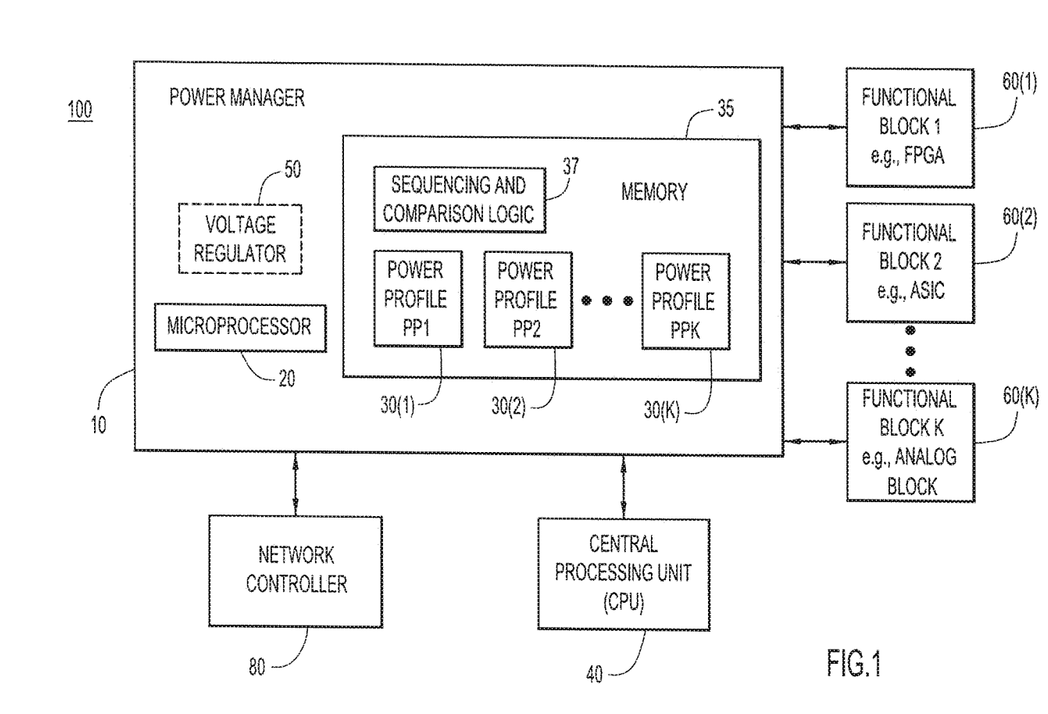
FIG. 1 is a block diagram of an example electronic system, showing various components that may be monitored by a power manager, according to the techniques disclosed herein.

FIG. 1 is a block diagram of a system 100 capable of supplying power and performing a power on sequence for various components of the system. System 100 may comprise a power manager 10, a plurality of functional blocks 60(1) to 60(K), a network controller 80, and a central processing unit (CPU) 40. The network controller may be an integrated chip, e.g., an Ethernet Media Access Control (MAC) chip or a WiFi controller. Power manager 10 may include a microprocessor 20, a voltage regulator 50 and a memory 35. Memory 35 may comprise a plurality of individual power profiles PP1 30(1) to PPK 30(K), as well as sequencing and comparison logic 37. Each individual power profile (e.g., each of 30(1) to 30(K)) may be associated with a particular phase of powering up a system. Individual power profiles PP1 30(1) to PPK 30(K), which collectively form composite power profile 30, may indicate expected power consumption for a particular stage of bringing a system online. For example, individual power profile 30(2) may comprise expected power consumption for a given or multiple functional blocks 60(1) to 60(K), which may include an FPGA, an ASIC, and an analog block. System 100 also has a power supply (not shown). Applicants note that variable K does not necessarily represent the same integer value regarding the individual power profiles PP1 30(1) to PPK 30(K) and functional blocks 60(1) to 60(K).

Voltage regulator 50 may be integrated with power manager 10 or may be a discrete functional block that is connected to power manager 10. Voltage regulator 50 may contain circuitry for converting input system power (not shown) into suitable voltages and currents for distribution to, e.g., one or more functional blocks 60(1) to 60(K) as well as other components such as CPU 40. Voltage regulator 50 may also be controlled by power manager 10. As mentioned previously, the various components may have differing voltage requirements from each other, and the power manager 10 provides the correct order of sequencing and proper power supply to bring each component of the system online in a safe manner. Those skilled in the art will appreciate that power sequencing is system specific, and the order in which various components are brought online is determined by the particular characteristics or composition of a system. Voltage regulator 50 may include circuitry for converting AC power to DC power, as well as circuitry for stepping up and stepping down voltages. Sequencing and comparison logic 37 may be implemented in hardware and/or software.

Figure 2:
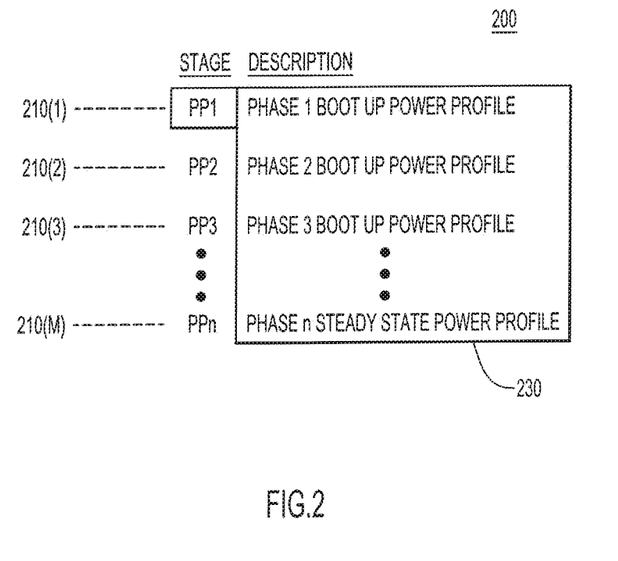
FIG. 2 is an illustration showing individual power profiles for each phase of powering up a system (collectively referred to as a composite power profile), according to the techniques disclosed herein.

FIG. 2 shows an example composite power profile 200 comprising individual power profiles PP1 210(1)-PPn 210(M), for a respective phase of a power on sequence (including steady state). As shown in this figure, the power on sequence of a system is typically divided up into a number of phases, e.g., Phase 1 through Phase n, as not all components are powered on at the same time. The composite power profile 200 comprises a plurality of individual power profiles PP1 210(1)-PPn 210(M), wherein each individual power profile represents an expected power consumption for each corresponding phase, e.g., Phase 1-Phase n, of powering up a system. A description 230 of each individual power profile 210(1)-210(M) is also shown in this figure. For example, the first individual power profile PP1 210(1) may involve expected power consumption for powering on the main CPU as well as supplying low power to some memory devices, e.g., non-volatile random access memory (NVRAM) or flash memory. The second individual power profile PP2 210(2) may involve expected power consumption for powering on additional functional blocks as well as supplying active power (increased power) to flash memory. The last individual power profile PPn 210(M) may represent expected power consumption of a system at steady state.

Each individual power profile PP1 210(1)-PPn 210(M) is configured to be within bounded tolerances, and represents expected power consumption of an unmodified system (i.e., without illicit or rogue hardware) for each phase of boot-up through steady state. In operation, and as explained more fully below, the power manager 10 (FIG. 1) is configured to monitor observed power consumption of a given system, in order to compare observed power consumption with the expected power consumption of the respective individual power profiles.

In some embodiments, as the system progresses through various phases of boot-up, an individual power profile may reflect a combination of one or more preceding individual power profiles. As a simplistic example, the individual power profile for Phase 2 PP2 210(2) may be a function of the individual power profile of Phase 1 PP1 210(1) (as some or all of the components powered up during Phase 1 may continue to receive power during Phase 2) in addition to power requirements for components that are powered on during Phase 2. In other embodiments, an individual power profile may be distinct from previous individual power profiles.

Deviations from an individual power profile may occur because illicit or rogue hardware may draw additional system power in order to function. In some embodiments, voltage deviations as low as millivolts may be detected, while in other embodiments, current deviations as low as milliamps may be detected. Additionally, other characteristics, such as timing and/or impedance deviations, may also be utilized to detect unauthorized hardware.

In one possible implementation, each of the plurality of phases of the powering on process, e.g., Phase 1 to Phase n, is examined individually for deviations from expected electrical characteristics as designated by each individual power profile.

Figure 3A:
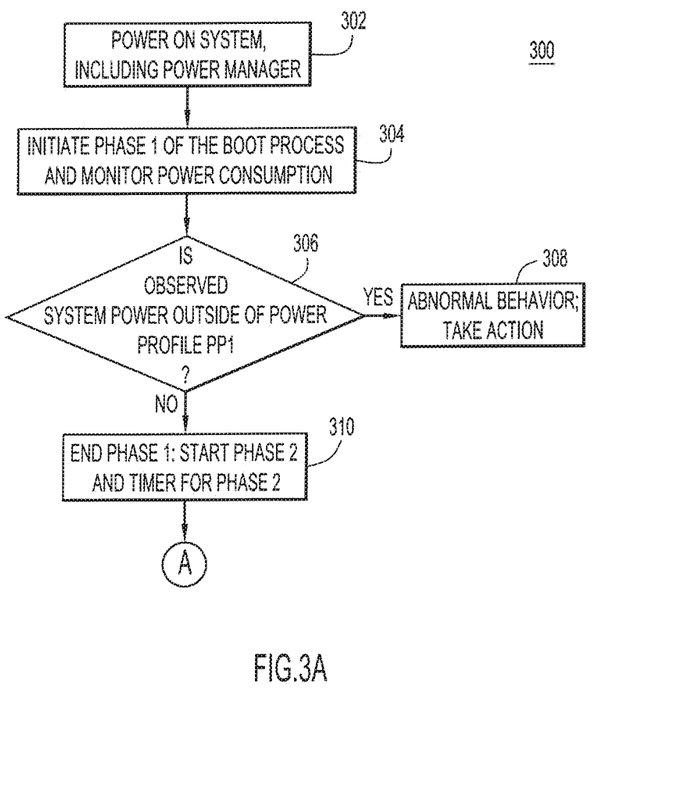
FIG. 3A is a flow chart depicting example power profile comparison and sequencing logic for a power manager, according to the techniques disclosed herein.

FIG. 3A illustrates an example flow chart 300 of operations of power sequencing and comparison logic 37. This example is not intended to be limiting with regard to the order or inclusion of particular steps with respect to this process. At operation 302, a system is powered on, including the power manager 10 itself. At operation 304, the first phase (Phase 1) of the boot-up process is initiated, and the power manager 10 monitors observed power consumption of the system 100 for this given phase. For example, during Phase 1, low power levels may be supplied to flash and system memory (not shown), and reset power levels may be supplied to CPU 40. Thus, during this phase, observed CPU power consumption as well as observed power consumption by flash and system memory may be monitored. At operation 306, the observed system power consumption (e.g., memory and CPU consumption) may be compared to the expected power consumption, which is based upon the power profile PP1 210(1), to determine if the observed power consumption is out of profile, e.g., not within the metrics of expected power consumption as specified according to power profile PP1. Accordingly, if the observed power consumption is determined to be out of profile, at operation 308, an action may be performed to indicate that abnormal behavior is occurring. At operation 310, monitoring of phase 1 is complete, and monitoring of the next phase, e.g., Phase 2, may begin.

In one possible implementation, a timer may be used to monitor the amount of time that it takes a system to progress through or complete a certain phase. In this example, at operation 310, a timer is started at the beginning of Phase 2, to monitor progression through this phase. With the use of a timer, a power manager may monitor not only increases in observed power consumption as compared to expected power consumption, but also, a power manager may consider timing characteristics associated with observed power consumption. For instance, if a CPU exhibits an increase in observed power consumption prior to a specified time (e.g., the observed power consumption of the CPU increases to a Phase 2 level while the system is in Phase 1), then the power manager may detect and flag this behavior as abnormal. Additionally, a timer may be used to monitor observed power consumption within a particular phase of powering up a system, e.g., if an individual power profile specifies an increase in power consumption during the middle of a particular phase, the timer may be used to verify that the power increase did not occur during the beginning or end of the phase.

Figure 3B:
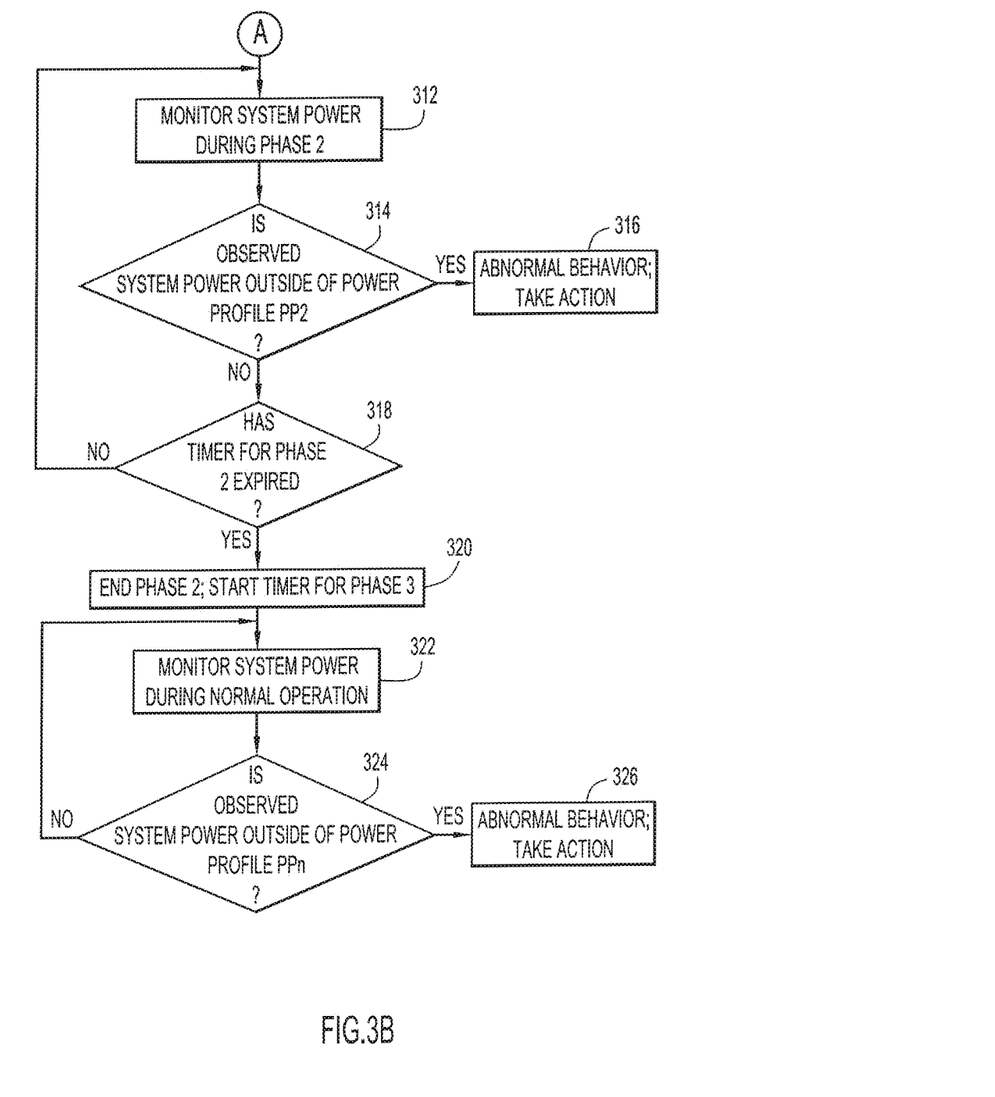
FIG. 3B is a continuation of FIG. 3A, and depicts example power profile comparison and sequencing logic for a power manager, according to the techniques disclosed herein.

Referring to FIG. 3B, at operation 312, the power manager 10 monitors observed power consumption within the system for the second phase of the boot up process, e.g., Phase 2. During the second phase of boot-up, increased or active power levels may be supplied to, e.g., flash memory, and low power may be supplied to the CPU and system memory. At operation 314, the observed power consumption for Phase 2 of system boot-up is compared against the expected power consumption based upon the power profile PP2 to determine if the observed power consumption is out of profile, e.g., not within the metrics of expected power consumption as specified by power profile PP2. At operation 316, if the observed power consumption is determined to be out of profile, an action may be performed to indicate that abnormal behavior is occurring. At operation 318, the power manager 10 determines if the timer for phase 2 has expired. As discussed previously, the timer for phase 2 may track the time that the system progresses through Phase 2, and thus, determine if power is being consumed outside of expected time ranges. If the phase 2 timer has not expired, the power manager 10 will continue to monitor observed power consumption of the system during Phase 2. If the timer has expired, the power manager progresses to the next stage of power sequencing, ending the second phase (e.g., Phase 2), and beginning a subsequent phase, e.g., Phase 3, as indicated at operation 320.

During Phase 3 (not shown), e.g., active power levels for flash memory, normal power levels for system memory and low power levels for CPU may be supplied to the system 100. Observed power consumption is monitored in an analogous fashion as described previously at operations 312-320. Operations depicted in operations 312-320 may be repeated for each subsequent phase of boot-up until reaching the final stage of powering on a system.

During the final stage of powering up a system, full power may be supplied to the system to reach normal operations. After the system is fully powered on, observed power consumption of the system is monitored at operation 322. At operation 324, if the observed power consumption of the system is determined to be outside of the expected power consumption as specified by the power profile PPn, appropriate action may be taken at operation 326. Once the system reaches normal operations or steady state, a timer may not be needed, as there may not be a specified time limit for remaining in steady state operation.

Actions taken may include actions chosen by the designer or potentially defined by a user, including: powering down one or more components of the system (up to and including the entire system), logging a message, sending an alert (e.g., by email or other electronic notification), lighting an indicator on the device being powered up, etc. Actions may be taken at any time from Phase 1 throughout Phase n.

As explained previously, power manager 10 may monitor observed power consumption based upon both temporal aspects as well as magnitudes for each phase of the boot-up process, including steady state operation. In this scenario, the individual power profile for a particular phase may contain, e.g., magnitudes of expected power consumption as a function of time. Other examples of power profiles may include power profiles without a temporal aspect.

Figure 4:
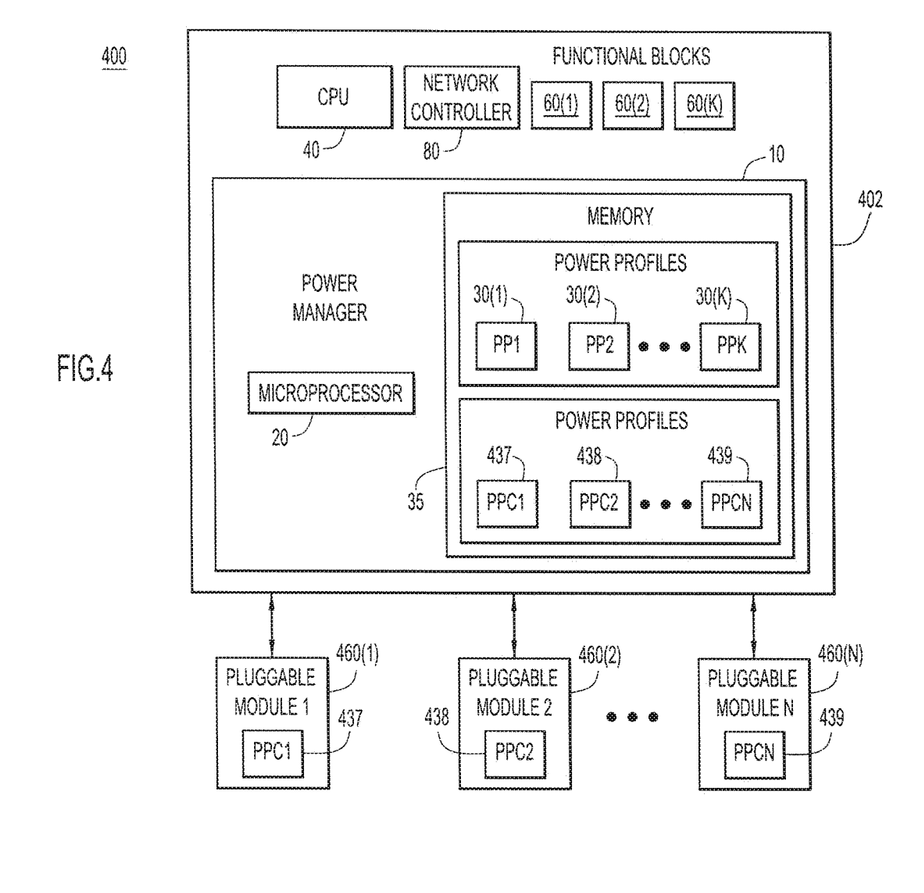
FIG. 4 is a block diagram similar to FIG. 2, but includes multiple pluggable modules that may also be monitored by a power manager, according to the techniques disclosed herein.

FIG. 4 shows an example system 400 that has one or more pluggable modules or cards 460(1)-460(N). Similar to system 100 of FIG. 1, system 400 may contain CPU 40, network controller 80, as well as one or more functional blocks 60(1)-60(K). System 400 may also contain a power manager 10, which may comprise a microprocessor 20 and a memory 35. Power manager 10 may also contain a voltage regulator and sequencing and comparison logic (not shown). Memory 35 may comprise one or more power profiles PP1 30(1)-PPK 30(K), collectively referred to as a composite power profile 30, for powering on the system (similar to FIGS. 1-3), as well as one or more composite power profiles PPC1 437-PPCN 439 for each removable module. For example, composite power profile 437 may contain individual power profiles corresponding to each stage of powering up pluggable module 1 460(1). Powering up the system (excluding the pluggable modules) may proceed in a similar manner as previously described with respect to FIGS. 1-3, and will not be repeated in detail here.

In connection with FIG. 4, as new modules 460(1)-460(N) are added to the system 402, a change in the observed power consumption of the entire system 400 may result. In order to differentiate between an illicit pluggable module and a legitimate pluggable or add on module, the module's composite power profile may be stored on the pluggable module itself, e.g., in accordance with tamper resistant cryptography chip protocols, in a unique identity and tamper resistant storage area, and provided to the power manager 10 upon plug-in. In other implementations, the power manager 10 may request or "pull" the composite power profile from the pluggable module. As an example, composite power profile PPC1 437, shown as stored in memory 35 of system 400, may be received from pluggable module 1 460(1), wherein the power profile may be stored physically on the card as PPC1 437. Composite power profile PPC1 437 may contain any number of individual power profiles for powering up pluggable module 460(1). Additionally, in some approaches, a composite power profile of a pluggable module (e.g., pluggable module 1 460(1)) may become integrated into a composite power profile of the host device (e.g., system 400) to which it is connected. In still other approaches, a composite power profile for a pluggable module may be stored in a memory not located on the card itself.

Additionally, the composite power profile may be encrypted and/or signed cryptographically to provide an additional layer of security. In such a scenario, the power manager 10 would verify the authenticity of the composite power profile before utilizing the associated data. Those skilled in the art will appreciate that a composite power profile may comprise a single stage (e.g., a single phase of boot-up for a pluggable device) or multiple stages (e.g., multistep process for bringing a pluggable device or system online); the complexity of the boot-up process will depend upon the system or device itself.

Once the system 400 has been updated to account for the composite power profile of the pluggable module(s) 460, the power manager 10 continues to monitor observed power consumption of the system in a similar manner as described previously.

In another embodiment, a motherboard may have a plurality of pluggable modules 460 or other line cards attached. During power-up, the power manager 10 may be powered on as part of Phase 1. This may be followed by each individual line card being powered up in a sequential fashion. When a line card is powered on by the power manager 10, the power manager, based upon the composite power profile of the line card, knows how much power the line card should draw. If the observed line card power consumption is not within designated specifications as provided by its corresponding composite power profile, then power manager 10 may signal a potential issue with the card.

Figure 5:
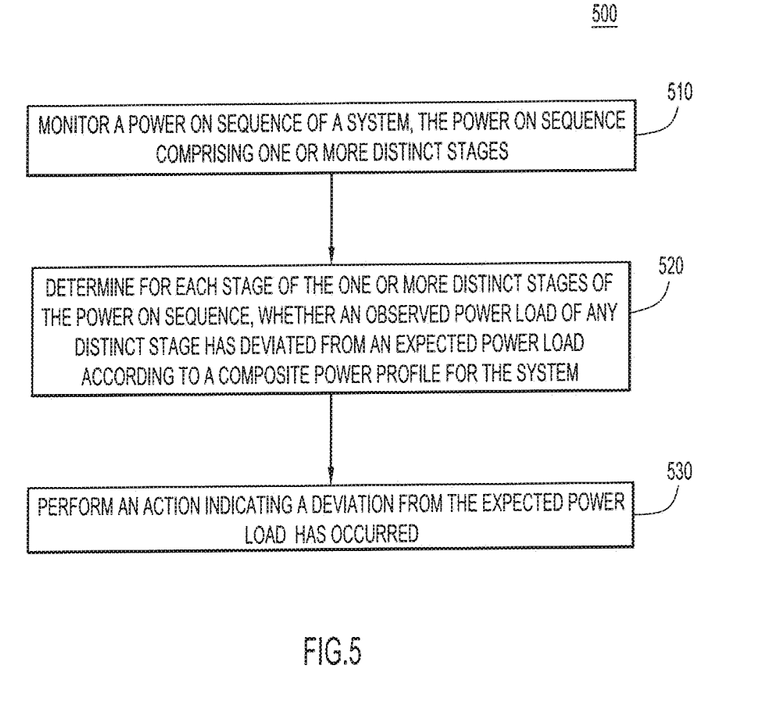
FIG. 5 is a flow chart depicting operations performed at a physical device with regard to powering on a system, according to the techniques disclosed herein.

FIG. 5 shows a flow chart describing power manager operations according to the techniques described herein. At operation 510, a power on sequence of a system, wherein the power on sequence comprises one or more distinct stages or phases, is monitored. At operation 520, for each stage of the one or more distinct stages of the power on sequence, it is determined whether an observed power load (power consumption) of any distinct stage has deviated from an expected power load, according to a composite power profile for the system. At operation 530, an action, when appropriate, is performed that indicates a deviation from the expected power load has occurred.

Figure 6:
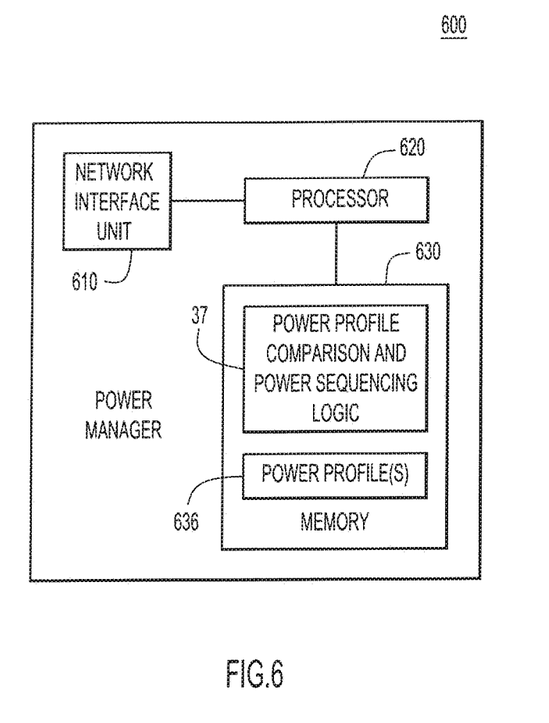
FIG. 6 is a block diagram of a physical device having power profile comparison and sequencing logic for a system, according to the techniques presented herein.

FIG. 6 illustrates an example block diagram of an apparatus (e.g., a physical device) configured to perform the techniques presented herein. The physical device 600, e.g., a power manager, comprises a network interface unit 610, a processor 620 and memory 630. The network interface unit 610 is configured to enable network communications by interfacing with a network. While conceptually illustrated as a "network interface unit," it will be appreciated that a physical device may contain more than one network interface or type of interface to communicate with other devices within a network. The processor 620 is one or more microprocessors or microcontrollers and executes power profile comparison and power sequencing logic 37 (see, e.g., FIG. 1) associated with the techniques disclosed herein. The memory 630 stores power profile comparison and power sequencing logic 37 along with one or more composite or individual power profile(s) 636.

Memory 630 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, memory 630 may comprise one or more tangible (e.g., non-transitory) computer readable storage media (e.g., a memory device) encoded with software comprising computer executable instructions, and when the software is executed by the processor 620, the processor 620 is operable to perform the operations described herein in connection with comparing power profiles and performing power sequencing. In other approaches, power profile comparison and power sequencing logic 37 and power profile(s) 636 are stored in one or more databases accessible by processor 620.

The functions of the processor 620 may be implemented by logic encoded in one or more tangible computer readable storage media or devices (e.g., storage devices compact discs, digital video discs, flash memory drives, etc. and embedded logic such as an application specific integrated circuit (ASIC), digital signal processor (DSP) instructions, software that is executed by a processor, etc.).

Figure 7:
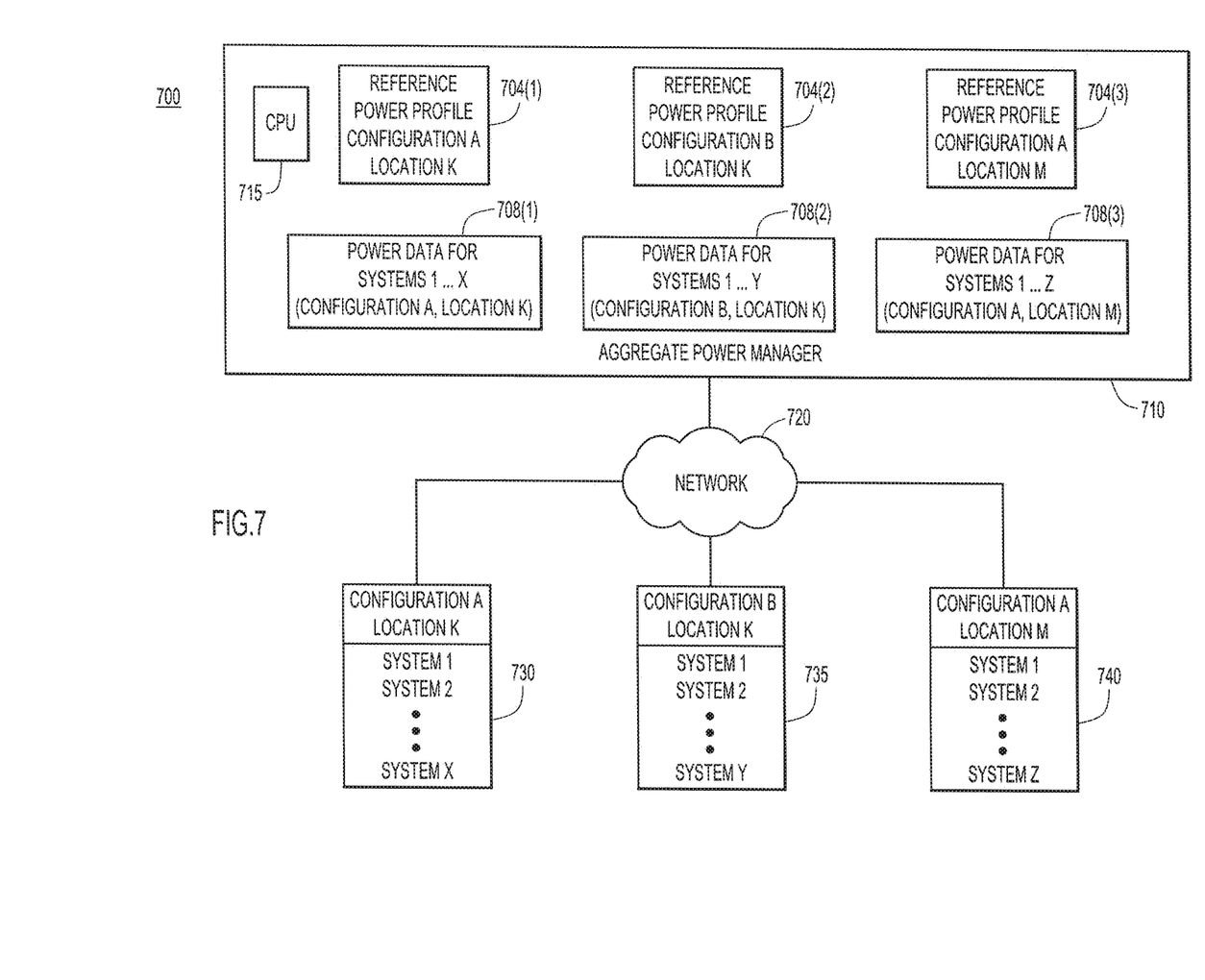
FIG. 7 is a block diagram depicting a communication system having an aggregate power manager with the capability to aggregate and correlate power consumption data, according to the techniques disclosed herein.

FIG. 7 illustrates a communication system 700 with an aggregate power manager 710 having the capability to collect and correlate observed power consumption or power load data for a plurality of systems. In one approach, computing systems may be grouped according to different configurations (e.g., platforms or types), e.g., configurations A and B, as well as according to environmental conditions, e.g., physical locations K and M. Thus, the computing systems shown in this example are grouped according to configuration and physical location as shown in categories 730, 735, and 740. The grouping of computing devices 730, 735, and 740 may be connected to a network 720, for receiving and transmitting data to the aggregate power manager 710. The aggregate power manager 710 may have a CPU 715 for processing data. Aggregate power manager 710 as well as each system in a particular grouping of computing devices may have a network interface (not shown). As such, the aggregate power manager 710 may collect observed power consumption or load data, e.g., 708(1)-708(3), for each system in a particular category 730, 735 and 740. The aggregate power manager 710 may then analyze each category of observed power consumption data 708(1)-708(3) to generate a reference power profile 704(1)-704(3) for each category. A reference power profile may represent a combination of power characteristics, e.g., an average, a mean, a weighted average or weighted mean, etc., for a particular category of computing devices, based on observed power load data. In other aspects, a reference power profile may also represent a combination of power characteristics associated with network load being processed by the device, e.g., at 90% traffic load, system current may be maximum, while at nominal traffic load, system current may be at 30%. It will be appreciated that aggregate power manager 710 may collect observed power load data for any number of groups of computing devices.

As examples, two categories with the same configuration and different locations, e.g., 730 and 740, may have differing reference power profiles due to environmental factors, and both may represent normal behavior. Additionally, two categories with different configurations and the same location, e.g., 730 and 735, may have differing reference power profiles and also may represent normal behavior.

In one possible implementation, observed power consumption data from each category may be provided to an external (e.g., cloud-based) aggregate power manager. This external aggregate power manager, such as power manager 710, may also be configured to collect environmental data (e.g., temperature, etc.) about a particular system through other mechanisms. In one approach, the aggregate power manager 710 may collect temperature data; this data may be used to correlate observed power characteristics of systems at a particular physical location. Additionally, environmental data may be helpful in accounting for deviations from an expected power load, and determining that such deviations are caused by environmental factors and not by illicit hardware. Additionally, other computing metrics may be monitored by the aggregate power manager 710, e.g., current, impedance, voltage, timing characteristics, etc.

As discussed in the above paragraph, environmental data may be used to account for deviations in observed power consumption for particular categories of systems. For example, if a particular category of systems exhibits observed power consumption that deviates from expected power consumption, the aggregate power manager 710 may be able to incorporate environmental factors into its analysis to determine that, for a given set of environmental conditions, the observed power consumption is indeed normal. For example, if a temperature fluctuation occurred in a server room, causing a deviation from an expected power consumption, aggregate power manager 710 may be able to determine that the deviation was not caused by illicit hardware (and instead was caused by the temperature fluctuation), and may permit systems to continue to run normally, instead of taking action to shut down the entire server room. In some approaches, aggregate power manager 710 may distribute an adjusted power profile, including environmental factors, to each system in a particular category to allow a local power manager of the system to monitor observed power consumption, without triggering an action indicative of abnormal behavior.

In other embodiments, correlation of observed power consumption data may also allow for actions to be taken as a result of suspected problems due to out of band issues (e.g., temperature and other environmental factors) external to a monitored system. Such environmental factors occur external to, or out of band, with regard to the system, and would need to be monitored via mechanisms external to the monitored system.

In the context of a same location, environmental factors might affect a multitude of systems (versus a small number of systems), and therefore, an aggregate power manager may distinguish between an observed power consumption variation caused by an environmental issue (more likely to have a global impact) versus an issue arising from rogue hardware that would affect a small number of computing systems (local impact only on the system(s) containing rogue hardware).

Nevertheless, if a particular system or small number of systems is determined to deviate from expected power consumption, even considering the impact of environmental factors into such expected power consumption, the aggregate power manager 710 may determine that such systems have been tampered with, and trigger an appropriate action. For example, the aggregate power manager 710 may issue a command, e.g., via a network, to an individual system, triggering the individual system to perform an action indicating that a deviation has occurred. In addition to the actions discussed preciously, actions may also include updating a cloud-based dashboard, etc. to indicate which systems have deviated from an expected power load.

Figure 8:
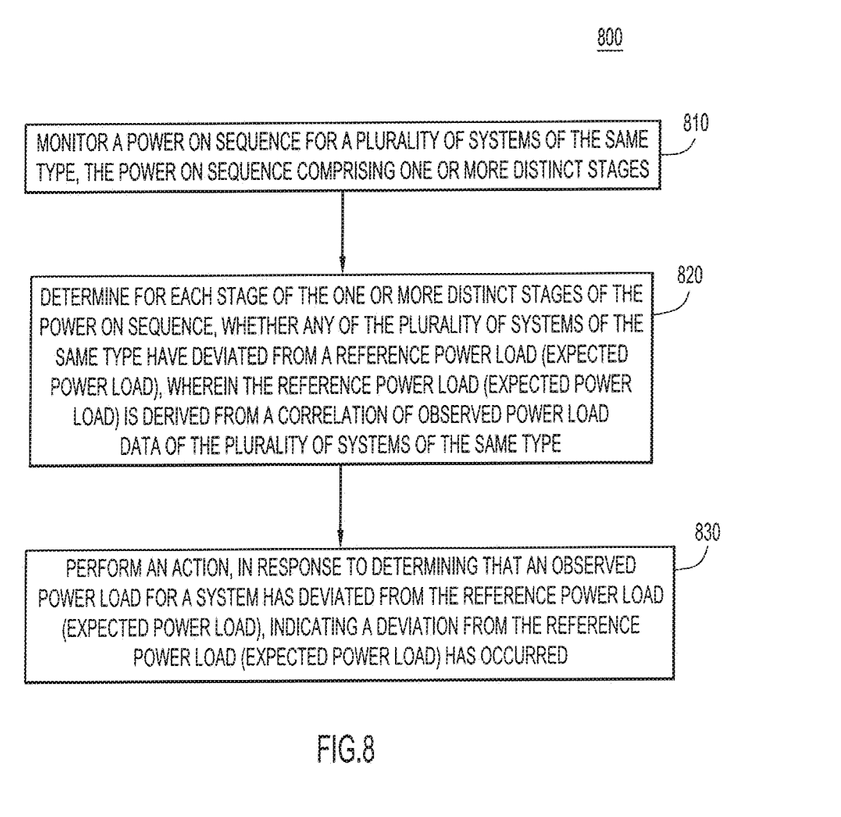
FIG. 8 is a flow chart depicting operations performed at a physical device with regard to aggregating and correlating power consumption data for a plurality of systems, according to the techniques presented herein.

FIG. 8 shows a flow chart describing operations of an aggregate power manager according to the techniques described herein. At operation 810, a power on sequence for a plurality of systems of the same type or category, wherein the power on sequence comprises one or more distinct stages, is monitored. At operation 820, for each stage of the one or more distinct stages of the power on sequence, it is determined whether any of the plurality of systems of the same type have deviated from an expected (reference) power load or consumption, wherein the expected power load is derived from a correlation of observed power load data of the plurality of systems of the same type. At operation 830, an action, when appropriate, is performed in response to determining that an observed power load for a system has deviated from the expected (reference) power load, indicating a deviation from the expected power load has occurred.

Figure 9:
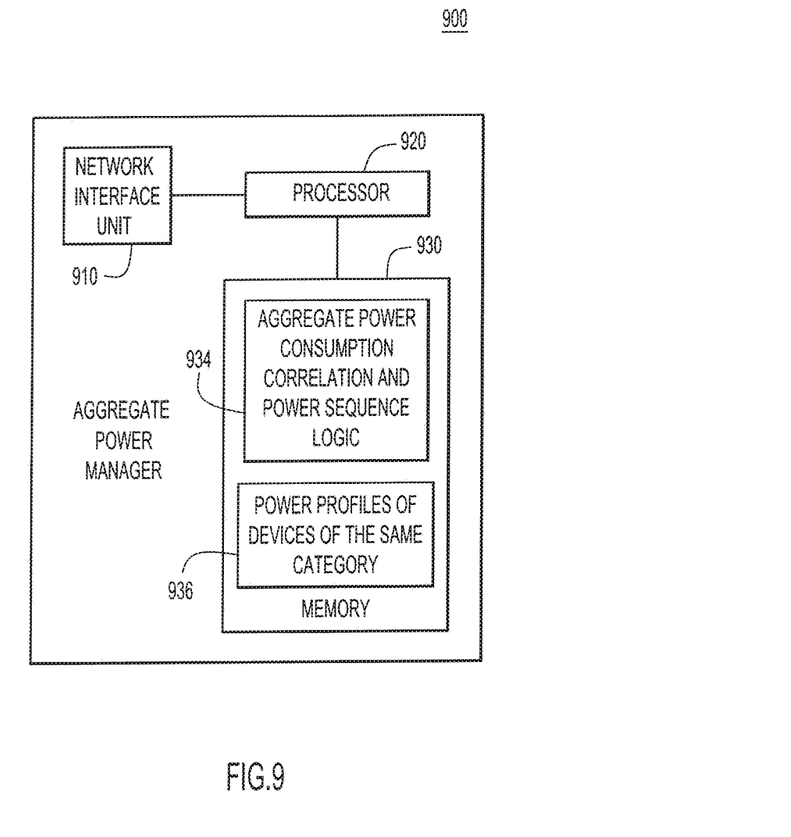
FIG. 9 is a block diagram of a physical device having aggregate power consumption data correlation and sequencing logic for a plurality of systems, according to the techniques described herein.

FIG. 9 illustrates an example block diagram of an apparatus 900 (e.g., a physical device) configured to perform the techniques presented herein. The physical device 900, e.g., an aggregate power manager, comprises a network interface unit 910, a processor 920, and memory 930. The network interface unit 910 is configured to enable network communications by interfacing with a network. While conceptually illustrated as a "network interface unit," it will be appreciated that a physical device may contain more than one network interface or type of interface to communicate with other devices within a network. The processor 920 is one or more microprocessors or microcontrollers and executes the aggregate power consumption correlation and power sequence logic 934 associated with the techniques disclosed herein. The memory 930 stores an aggregate power consumption correlation and power sequence logic 934 (configured to effectuate the operations depicted in, e.g., FIG. 8) along with power profile(s) 936.

Memory 930 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 930 may comprise one or more tangible (e.g., non-transitory) computer readable storage media (e.g., a memory device) encoded with software comprising computer executable instructions, and when the software is executed by the processor 920, the processor 920 is operable to perform the operations described herein in connection with the aggregate power consumption correlation and power sequence logic 934. In other approaches, aggregate power consumption correlation and power sequence logic 934 and power profiles 936 are stored in one or more databases accessible by processor 920.

The functions of the processor 920 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

In one possible implementation, a power manager is contained within a secure enclosure to guard against tampering. Enclosing the power manager in a secure enclosure may prevent or prohibit tampering with power profiles. Additionally, power profiles residing on a removable module may also be contained within an enclosure located on the physical module.

As discussed previously, power profiles may be encrypted and/or digitally signed. For example, composite power profiles of a removable device may be stored on the physical device itself. The power manager, upon obtaining the composite power profile of the removable device, may utilize a digital signature or verify via encryption techniques that the profile has not been altered from the original power profile provided by a manufacturer.

Power managers, as described herein, may be in communication with a system CPU. If a programmed power consumption event occurs (e.g., an event that increases or decreases power consumption, such as the computer going into hibernation mode), the CPU may communicate this event to the power manager, and the power manager may be configured to incorporate this information into the composite power profile of the system to adjust expected power consumption during this event. Thus, as this type of event would be incorporated into the composite power profile, a system entering hibernation mode would not constitute a deviation from normal behavior.

It is noted that if a component or removable module of a system is replaced, the replacement part(s) should preferably have a similar composite or individual power profile (as compared to the original power profile), but if not, the composite power profile of the system can be updated to account for such a change in hardware. Further, if additional devices or components are added to a system, the power manager may be updated with a corresponding power profile from the added device or component. Otherwise, replacement or addition of a part or component may trigger an abnormal power consumption event.

A power manager, in accordance with the embodiments described herein, may also be used for diagnostic purposes by monitoring system power or voltage, thereby indicating when a malfunction or fault has occurred. For example, if a specific piece of hardware is malfunctioning, its observed power load may deviate from an expected power load, signaling a problem with the hardware. Thus, power managers are also useful for diagnosing problems and providing early failure detection for systems that have, e.g., systems with a fixed architecture.

Advantages of the techniques disclosed herein include having the capability to detect modifications internal to a device or system itself, as compared to detecting modifications external to such a device or system. Additionally, the techniques presented herein have the granularity and visibility to solve the problem of detecting individual rogue hardware components within a system or device.

In sum, a power manager, which may be an internal and integral component of a system, may be employed to discretely monitor power usage of individual phases of a boot process, including steady state operation, to detect illicitly added or modified rogue hardware. In the event, e.g., an extra piece of hardware has been added illicitly to the system, the power manager is able to detect deviations from an expected power consumption, and respond by taking a specified action. Actions may include powering down the entire system, logging, alerting, etc. As described herein, these techniques provide mechanisms for detecting rogue hardware within a system through local analysis or with a remote system that aggregates, correlates, and analyzes data among various types of platforms in potentially differing environments.

A method is provided comprising: monitoring a power on sequence of a system, the power on sequence comprising one or more distinct stages; determining for each stage of the one or more distinct stages of the power on sequence, whether an observed power load of any distinct stage has deviated from an expected power load according to a composite power profile for the system, wherein the composite power profile specifies expected power characteristics of the system for each stage of the power on sequence; and when the observed power load of a given distinct stage has deviated from the expected power load for that stage, performing an action indicating that a deviation from the expected power load has occurred.

Additionally, a method is also provided comprising: monitoring a power on sequence for a plurality of systems of the same type, the power on sequence comprising one or more distinct stages; for respective individual systems of the plurality of systems, determining for each stage of the one or more distinct stages of the power on sequence, whether any of the plurality of systems of the same type have deviated from an expected power load, wherein the expected power load is derived from a correlation of power load data from the plurality of systems of the same type; in response to determining that a power load for a system has deviated from the expected power load, performing an action indicating a deviation from the expected power load has occurred.

Further methods are provided including, performing an action, in response to receiving a command from a remote system, indicating a deviation from a reference power profile has occurred, wherein the remote system monitors a power on sequence for a plurality of systems of the same type to generate a reference power profile derived from a correlation of observed power load data from the plurality of systems of the same type, and sends a command in response to determining that an individual system has deviated from the reference power profile.

Also, an apparatus is provided comprising a network interface unit configured to receive communications over a network. A processor is coupled to the network interface unit and a memory and configured to: monitor a power on sequence of a system, the power on sequence comprising one or more distinct stages; determine for each stage of the one or more distinct stages of the power on sequence, whether an observed power load of any distinct stage has deviated from an expected power load according to a composite power profile for the system, wherein the composite power profile specifies expected power characteristics of the system for each stage of the power on sequence; and perform an action, when the observed power load of a given distinct stage has deviated from the expected power load, indicating that a deviation from the expected power load has occurred.

Furthermore, a computer readable media is provided encoded with software comprising computer executable instructions and when the software is executed operable to: monitor a power on sequence of a system, the power on sequence comprising one or more distinct stages; determine for each stage of the one or more distinct stages of the power on sequence, whether an observed power load of any distinct stage has deviated from an expected power load according to a composite power profile for the system, wherein the composite power profile specifies expected power characteristics of the system for each stage of the power on sequence; and perform an action, when the observed power load of a given distinct stage has deviated from the expected power load, indicating that a deviation from the expected power load has occurred.

The above description is intended by way of example only. Various modifications and structural changes may be made therein without departing from the scope of the concepts described herein and within the scope and range of equivalents of the claims.

What is claimed is:

1. A method comprising:
monitoring a power on sequence of a system by monitoring power loads of functional blocks in the system in a predetermined order prior to the system being fully powered on, wherein the functional blocks each include at least one computing component and the power on sequence comprises a plurality of distinct stages that each initialize in a unique functional block of the functional blocks in the predetermined order prior to the system being fully powered on;
determining, for each distinct stage of the plurality of distinct stages of the power on sequence, whether a given power load of the monitored power loads has deviated from an expected power load of a corresponding power profile included in a composite power profile for the system, wherein each power profile in the composite power profile specifies expected power characteristics of the at least one computing component included in a corresponding unique functional block, and repeating the determining, for each distinct stage, to progress through the plurality of distinct stages of the power on sequence, and corresponding power profiles of the composite power profile, in the predetermined order; and
powering down the system when the given power load of a given distinct stage of the plurality of distinct stages has deviated from the expected power load for the given distinct stage.

2. The method of claim 1, wherein determining further comprises determining that the given power load for the distinct stage has deviated from the expected power load based on monitored voltage, current, impedance or timing characteristics of the corresponding unique functional block.

3. The method of claim 1, further comprising:
when the given power load for the distinct stage has deviated from the expected power load, performing one or more of the following actions: logging, sending an alert, activating an indicator, or updating a dashboard.

4. The method of claim 1, wherein the composite power profile is a first composite power profile, and the method further comprises:
receiving a second composite power profile from a removable device, wherein the second composite power profile is stored on the removable device and specifies expected power characteristics of the removable device for each distinct stage of one or more distinct stages of a power on sequence for the removable device;
determining for each distinct stage of the one or more distinct stages of the power on sequence for the removable device, whether an observed power load of any distinct stage has deviated from its expected power load according to the second composite power profile of the removable device; and
when the observed power load of a given distinct stage has deviated from its expected power load, performing an action indicating that a deviation from the expected power load of the removable device has occurred.

5. The method of claim 4, wherein the second composite power profile comprises a signed composite power profile or a signed and encrypted composite power profile.

6. The method of claim 1, further comprising:
generating one or more of the power profiles included in the composite power profile based on one or more reference power profiles received from a remote system, wherein the remote system monitors power on sequences for a plurality of systems of a same type to generate the one or more reference power profiles from correlations of observed power load data from the plurality of systems of the same type.

7. The method of claim 6, wherein the remote system incorporates environmental factors-into the one or more reference power profiles to account for out of band factors that may influence the observed power load data.

8. The method of claim 6, wherein a specific reference power profile of the one or more reference power profiles received from the remote system is incorporated into the composite power profile of the system as one of the power profiles.

9. The method of claim 1, wherein the monitoring includes using a timer to sequence through the plurality of distinct stages according to the power on sequence, and the method further comprises:
starting the timer, and performing the determining while the timer has not expired; and
when the timer has expired, repeating the starting the timer and the determining while the timer has not expired for a next one of the distinct stages, until the determining has progressed through the plurality of distinct stages of the power on sequence.

10. An apparatus comprising:
a network interface unit configured to receive communications over a network; and
a processor coupled to the network interface unit and a memory and configured to:
monitor a power on sequence of a system by monitoring power loads of functional blocks in the system in a predetermined order prior to the system being fully powered on, wherein the functional blocks each include at least one computing component and the power on sequence comprises a plurality of distinct stages that each initialize a unique functional block of the functional blocks in the predetermined order prior to the system being fully powered on;
determine, for each distinct stage of the plurality of distinct stages of the power on sequence, whether a given power load of the monitored power loads has deviated from an expected power load of a corresponding power profile included in a composite power profile for the system, wherein each power profile in the composite power profile specifies expected power characteristics of the at least one computing component included in a corresponding unique functional block, and repeat the determine, for each distinct stage, to progress through the plurality of distinct stages of the power on sequence, and corresponding power profiles of the composite power profile, in the predetermined order; and
power down the system when the given power load of a given distinct stage of the plurality of distinct stages has deviated from the expected power load for the given distinct stage.

11. The apparatus of claim 10, wherein the processor is further configured to:
   determine that the given power load for the given distinct stage has deviated from the expected power load based on monitored voltage, current, impedance or timing characteristics of the corresponding unique functional block.

12. The apparatus of claim 10, wherein the processor is further configured to:
   when the given power load for the distinct stage has deviated from the expected power load, perform one or more of the following actions: logging, sending an alert, activating an indicator, or updating a dashboard.

13. The apparatus of claim 10, wherein the composite power profile is a first composite power profile, and the processor is further configured to:
   receive a second composite power profile from a removable device, wherein the second composite power profile is stored on the removable device and specifies expected power characteristics of the removable device for each distinct stage of one or more distinct stages of a power on sequence for the removable device;
   determine for each distinct stage of the one or more distinct stages of the power on sequence for the removable device, whether an observed power load of any distinct stage has deviated from its expected power load according to the second composite power profile of the removable device; and
   when the observed power load of a given distinct stage has deviated from its expected power load, perform an action indicating that a deviation from the expected power load of the removable device has occurred.

14. The apparatus of claim 10, wherein the processor is further configured to:
   generate one or more of the power profiles included in the composite power profile based on one or more reference power profiles received from a remote system, wherein the remote system monitors power on sequences for a plurality of systems of a same type to generate the one or more reference power profiles from correlations of observed power load data from the plurality of systems of the same type.

15. One or more non-transitory computer readable storage media encoded with software comprising computer executable instructions and when the software is executed operable to:
   monitor a power on sequence of a system by monitoring power loads of functional blocks in the system in a predetermined order prior to the system being fully powered on, wherein the functional blocks each include at least one computing component and the power on sequence comprises a plurality of distinct stages that each initialize a unique functional block of the functional blocks in the predetermined order prior to the system being fully powered on;
   determine, for each distinct stage of the plurality of distinct stages of the power on sequence, whether a given power load of the monitored power loads has deviated from an expected power load of a corresponding power profile included in a composite power profile for the system, wherein each power profile in the composite power profile specifies expected power characteristics of the at least one computing component included in a corresponding unique functional block, and repeat the determine, for each distinct stage, to progress through the plurality of distinct stages of the power on sequence, and corresponding power profiles of the composite power profile, in the predetermined order; and
   power down the system when the given power load of a given distinct stage of the plurality of distinct stages has deviated from the expected power load for the given distinct stage.

16. The non-transitory computer readable storage media of claim 15, further comprising computer executable instructions operable to:
   determine that the given power load for the given distinct stage has deviated from the expected power load based on monitored voltage, current, impedance or timing characteristics of the corresponding functional block.

17. The non-transitory computer readable storage media of claim 15, further comprising computer executable instructions operable to:
   when the given power load for the distinct stage has deviated from the expected power load, perform one or more of the following actions: logging, sending an alert, activating an indicator, or updating a dashboard.

18. The non-transitory computer readable storage media of claim 15, wherein the composite power profile is a first composite power profile, and the non-transitory computer readable storage media further comprises computer executable instructions operable to:
   receive a second composite power profile from a removable device, wherein the second composite power profile is stored on the removable device and specifies expected power characteristics of the removable device for each distinct stage of one or more distinct stages of a power on sequence for the removable device;
   determine for each distinct stage of the one or more distinct stages of the power on sequence for the removable device, whether an observed power load of any distinct stage has deviated from its expected power load according to the second composite power profile of the removable device; and
   when the observed power load of a given distinct stage has deviated from its expected power load, perform an action indicating that a deviation from the expected power load of the removable device has occurred.

19. The non-transitory computer readable storage media of claim 18, wherein the second composite power profile comprises a signed composite power profile or a signed and encrypted composite power profile.

20. The non-transitory computer readable storage media of claim 15, further comprising computer executable instructions operable to:
   generate one or more of the power profiles included in the composite power profile based on one or more reference power profiles received from a remote system, wherein the remote system monitors power on sequences for a plurality of systems of a same type to generate the one or more reference power profiles from correlations of observed power load data from the plurality of systems of the same type.

* * * * *